United States Patent [19]

Hatch

[11] 4,275,323
[45] Jun. 23, 1981

[54] ACTIVE SHIELD FOR DISK-DRUM ACYCLIC MACHINE

[75] Inventor: Burton D. Hatch, Ballston Lake, N.Y.

[73] Assignee: General Electric Company, Schenectady, N.Y.

[21] Appl. No.: 74,869

[22] Filed: Sep. 12, 1979

[51] Int. Cl.³ .......................................... H02K 31/00
[52] U.S. Cl. ..................................... 310/178; 310/52; 310/114; 310/219; 310/268
[58] Field of Search ..................... 310/10, 40, 52, 178, 310/219, 234, 114, 266, 268; 322/48; 318/253

[56] References Cited

U.S. PATENT DOCUMENTS

| | | | |
|---|---|---|---|
| 3,211,936 | 10/1965 | Harvey | 310/178 |
| 3,579,005 | 5/1971 | Noble | 310/178 |
| 3,585,398 | 6/1971 | Harvey | 310/178 |
| 3,586,894 | 6/1971 | Mueller | 310/178 |
| 3,944,865 | 3/1976 | Jewitt | 310/178 |
| 4,027,184 | 5/1977 | Hurley | 310/219 |
| 4,097,758 | 6/1978 | Jenkins | 310/219 |
| 4,146,807 | 3/1979 | Hatch | 310/219 |

FOREIGN PATENT DOCUMENTS

1266621 3/1972 United Kingdom ..................... 310/178

*Primary Examiner*—R. Skudy
*Attorney, Agent, or Firm*—Nathan D. Herkamp; James C. Davis, Jr.; Paul R. Webb, II

[57] ABSTRACT

An active shield is attached to an acyclic machine surrounding stacks of interleaved rotor and stator disks and axially aligned with the main excitation coil disposed within the rotor shaft. The active shield surrounds the magnetic disks of the rotor and stator to interact with the magnetic flux field of the main excitation coil to limit flux density outside the stator to predetermined levels. The active shield may be energized alone to provide emergency operation of the machine. The coil acting as the shield is excited to have a polarity opposite that of the main excitation coil, so that outside the active shield the magnetic fields tend to cancel.

10 Claims, 5 Drawing Figures

ACTIVE SHIELD FOR DISK-DRUM ACYCLIC MACHINE

BACKGROUND OF THE INVENTION

The invention herein described was made in the course of or under a contract with the United States Navy.

1. Field of the Invention

This invention relates to acyclic machines, and more particularly, to such machines utilizing a plurality of high current density field coils, such as superconducting field coils, and coaxial stacks of rotor disk interleaved with stator disks connected by a drum to form a disk-drum combination acyclic machine.

2. Description of the Prior Art

In my U.S. Patent application Ser. No. 898,923, filed Apr. 21, 1978, now U.S. Pat. No. 4,208,600, issued June 17, 1980, assigned to the instant assignee, and which is incorporated herein by reference thereto, I described a disk-drum type acyclic machine. In such machines, multiple field coils are disposed in spaced, coaxial relationship and are energized to have opposed poles. Such a machine having n field coils, has n stacks of radially-extending rotor mounted circular disks, n stacks of stator mounted circular disks interleaved on a one-for-one basis with the rotor mounted disks, and n-1 axially-extending drums so positioned, that each of the interleaved stacks of rotor mounted and stator mounted circular disks is disposed in axial alignment and concentric with one of the field coils, respectively, and each of the drums is disposed, respectively, at the gap between two adjacent field coils and concentric therewith. Such a structure provides for utilization of the portion of the magnetic flux generated by the field coils extending in a direction generally perpendicular to the interleaved disks and also the portion of the magnetic flux extending in a direction generally perpendicular to the drums. This effectively utilized the high intensity magnetic fields which are produced by high current capacity coils.

In marine applications, strict limitations are imposed upon machine magnetic field leakage in the vicinity closely adjacent the machine, since operating personnel are required to work in close proximity to the machine. My instant invention provides a means to limit the external magnetic field of such a high field intensity machine.

Another characteristic of high current density coils is their requirement for cooling, in many applications to cryogenic temperatures. If during operation of the machine the cryogenic coolant were lost, the machine would become inoperable. Therefore, some means is required to provide operability of the cryogenic temperature portion of the machine. Such capability is referred to in marine applications as "take home" capability, i.e., the capability to return unassisted to a repair facility.

Accordingly, a primary object of the instant invention is to provide an easily fabricated, immediately available "take home" capability of an acyclic machine employing high current density cryogenic temperature field coils.

A further object is to provide active shielding around the acyclic machine to maintain the flux density of the magnetic field surrounding the machine within a predetermined maximum level at a given distance from the machine surface.

SUMMARY OF THE INVENTION

In a disk-drum type acyclic machine having a plurality of concentric axially spaced excitation coils and one of a plurality of stacks of rotor disks interleaved, respectively, with one of a plurality of stacks of stator disks disposed, respectively, in axial alignment with each coil and a drum disposed axially between each pair of adjacent coils and concentric therewith, an active shield is disposed radially outside and axially aligned with the stator and rotor disk stacks and is connected electrically to be of opposite polarity to the main field coil disposed axially aligned with said active shield. The active shield provides maximum utilization of high intensity magnetic flux produced by high current density field coils, and also provides a take home capability as well as active shielding of the high magnetic flux density machine. In a particular embodiment of the instant invention, copper coils are disposed axially aligned and radially-outside of superconducting field coils to provide active shielding thereof. In operation of the machine, the active shield windings are energized in opposite polarity to the main excitation coils.

BRIEF DESCRIPTION OF THE DRAWINGS

The features of the invention believed to be novel and unobvious over the prior art are set forth with particularity in the appended claims. The invention itself, however, as to organization, method of operation and objects and advantages thereof, may best be understood by reference to the following description taken in conjunction with the accompanying drawings wherein:

DESCRIPTION OF THE PREFERRED EMBODIMENTS

The particular machine shown in FIGS. 1-5 and described herein is merely exemplary, and the scope of my invention is defined in the claims.

Figure 1:
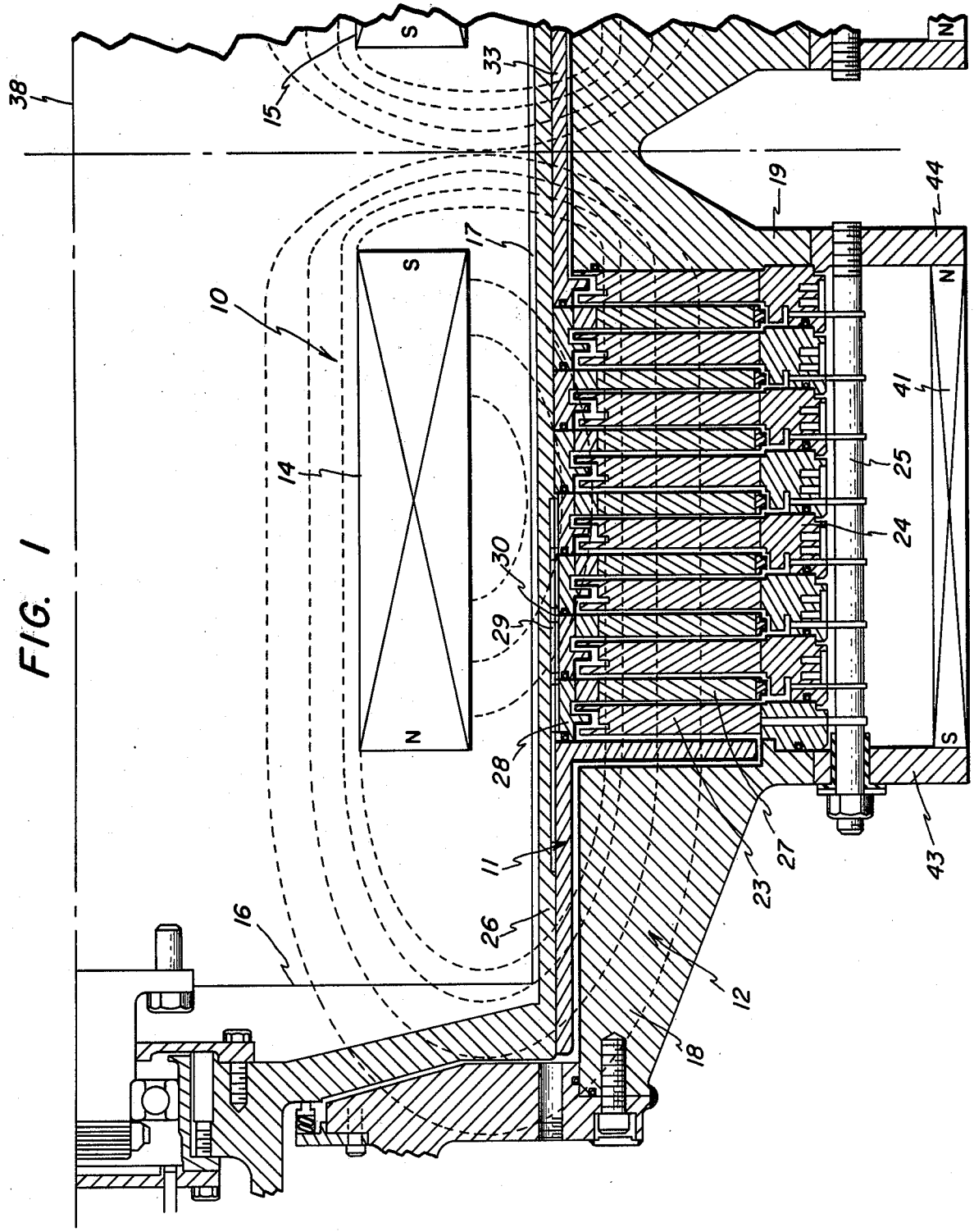
FIG. 1 is an enlarged partial cross-sectional view schematically illustrating an acyclic machine having the active shield of the instant invention attached thereto.
Figure 2:
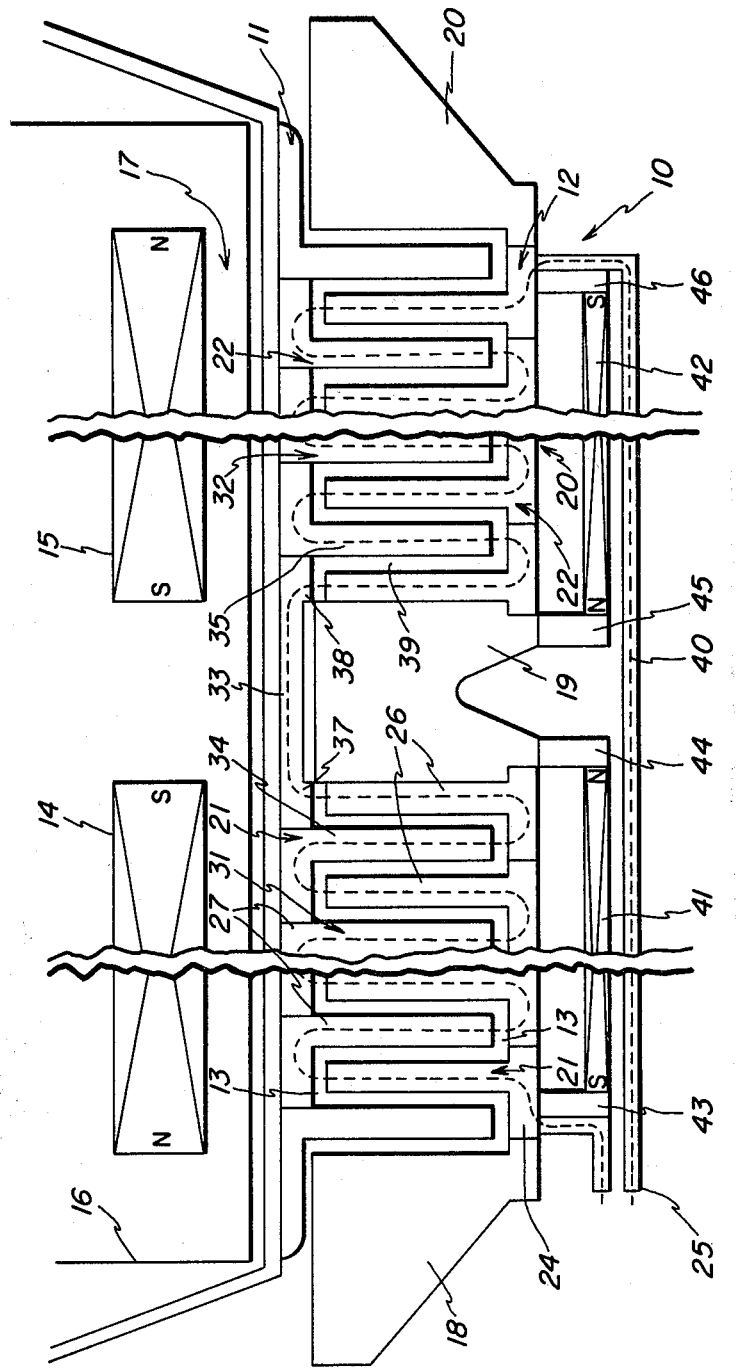
FIG. 2 is a schematic partial cross-sectional view of the machine of FIG. 1 with portions omitted, taken along a plane passing through the machine axis.

The machine 10 partially illustrated herein is a quadrupole high current density field coil machine, as shown in FIGS. 1 and 2, and illustrated in my earlier-cited U.S. Pat. No. 4,208,600. The machine 10 comprises rotor 11 and stator 12, electrically joined by current collectors 13. High current density field coils 14, 15 are disposed within a dewar 16 disposed within the rotor and separated therefrom by a vacuum gap 17. Field coils 14, 15 may comprise superconducting field coils of known materials cooled by liquid helium, or alternatively, may be copper or aluminum coils with appropriate means to cool the coils to liquid nitrogen temperature to provide high current density capacity. Rotor 11 and stator 12 are maintained in proper position to provide mechanical clearance by conventional bearings (not shown), which provide for rotation of rotor 11 relative to stator 12 about axis 38.

The stator 12 comprises the magnetic shielding sections 18, 19 and 20 and concentric stacks 21, 22 of stator disks 23. As shown in FIG. 1, each stator disk 23 is affixed to a stator collector ring 24, and the stator collector rings 24 are fastened together by a bolt 25 or some other appropriate fastener secured to shielding sections 18, 19.

Rotor 11 comprises a hollow cylindrical shaft 26 with rotor disks 27 mounted thereon via conductive rotor collector rings 28 which are secured to the shaft by a key 29 in an appropriately-shaped keyway 30 in rotor shaft 26. The rotor disks 27 are arranged in a plurality of stacks 31, 32 and disposed such that each stack of rotor disks is interleaved with the stacks 21, 22 of stator disks, respectively. An axially elongated annular drum 33 extends axially between two adjacent concentric rotor disks 34, 35 as shown in FIG. 2 and incorporates a rotor collector ring 36, 37 at either end thereof.

The machine shown in FIG. 2 employs two sets or stacks 21, 22 of stator disks 23 interleaved with respective sets or stacks 31, 32 of rotor disks 27. Any desired number of stacks of interleaved stator and rotor disks surrounding an equal number of field excitation coils could be employed. A rotor drum, such as drum 33, would be disposed between each pair of adjacent stacks of rotor disks to connect adjacent stacks of rotor disks. The disks 23 and 27 and the drum 33 made of highly conductive material such as copper or copper alloys, or alternatively may be made of low magnetic reluctance, electrically-conductive material, such as iron or alloys thereof. Iron or an alloy thereof is the prefered material, due to its favorable magnetic properties.

Current collection between adjacent stator disks and rotor disks across gap 39 in each respective stack is provided by liquid metal current collectors designated generally by numeral 13. For example, the current collectors 13 could be of the type described by me in my earlier-filed U.S. Pat. No. 4,146,807, issued Mar. 27, 1979 or my earlier-filed U.S. Pat. application Ser. No. 924,055, filed July 12, 1978, now U.S. Pat. No. 4,207,486, issued June 10, 1980, or the earlier-filed U.S. Patent application Ser. No. 878,786, filed Feb. 17, 1978 by Marshall, now U.S. Pat. No. 4,186,321, issued Jan. 29, 1980, each , respectively, assigned to the instant assignee and each, respectively, incorporated herein by reference thereto. Other collector configurations could be employed by the instant invention.

Figure 3:
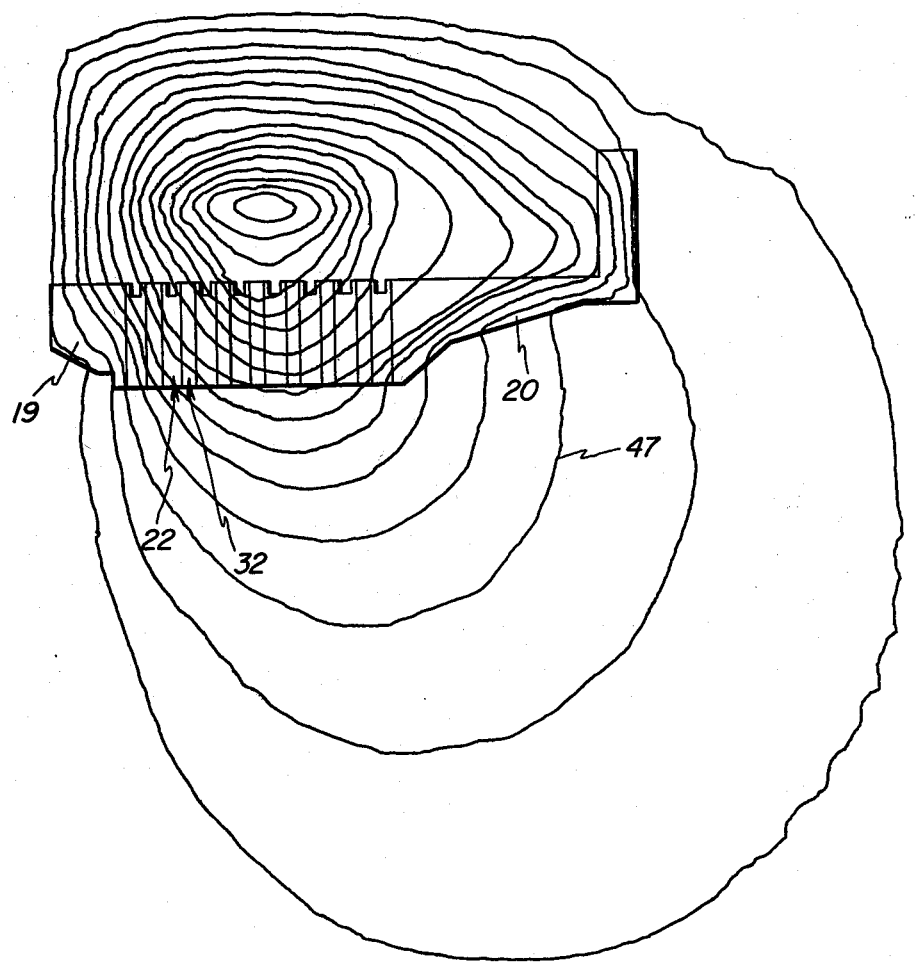
FIG. 3 represents a quadrant of the cross section of the acyclic machine of the instant invention and schematically illustrates the magnetic flux produced by two opposed main field coils.

Each of field coils 14 and 15 generates a high density magnetic field as shown in FIG. 3, having generally axially-directed flux passing through the disk stacks 21, 31 and 22, 32 and generally radially-directed flus passing through the rotor drum 33. Since the field coils 14, 15 are connected to a power source and energized to have poles in opposition as shown in FIGS. 1 and 2, the fields in the region of drum 33 are additive. This arrangement provides capability for maximum utilization of the flux generated by the high current density field coils. An electrical current is produced which flows along a path illustrated by the dashed line 40, FIG. 2, through adjacent stator and rotor disks 23, 27, respectively, and rotor drum 33 in a single current path through the machine.

In the instant invention, and active shield surrounding the stator is provided by placing a plurality of electromagnetic shielding coils 41, 42 around the outer periphery of the machine in axial alignment with each of the main excitation coils 14, 15, respectively. Each of the active shield coils 41, 42 is mounted on extensions 43, 44 and 45, 46, respectively, of the machine shielding members 18, 19, 20. Extensions 43, 44, 45 and 46 are made of nonmagnetic steel, in order to limit magnetic loss which would be created by extending magnetic material radially-outward from the stator. Coils 41, 42 are preferably of copper or other highly-conductive material, and are excited to be in polar opposition to main field coils 14, 15 as shown in FIG. 2, so that the flux from shielding coils 41, 42 opposes that of the main excitation coils 14, 15, respectively, at the positon radially outside of shielding coils 41, 42, respectively.

At the same time, this polar opposition causes the flux from the shielding coils 41, 42 to be additive to that of the main excitation coils 14, 15, respectively, in the region of the rotor and stator disk stacks 21, 31 and 22, 32, respectively, thereby adding to the torque generating capacity of the machine, when used as a motor. Although the amount of flux provided by shielding coils 41, 42 could be provided by increasing the power applied to the main field excitation coils, the shielding coils provide this added excitation and simultaneously provide shielding of the machine to limit external magnetic field intensity to a prescribed level at a pedetermined radial distance from the machine. Furthermore, the shielding coils provide a means of providing emergency excitation ("take home" capability) of the machine, should loss of coolant or other failure of the cryogenic equipment produce shut-down of the cryogenic temperature field coils. Such a feature is significant in marine applications in providing "take home", i.e., emergency power delivery to return the vessel to maintenance facilities; capability which is not provided by the cryogenic field coils. The excitation from shielding coils 41, 42 would be substantially less than that of the main field coils, but moderate level power to enable emergency return of the vessel to port would thereby be provided. Such a capacity could be significant in terms of returning a vessel from a remote site without requiring involvement of a second vessel to provide tow or other assistance.

Figure 4:
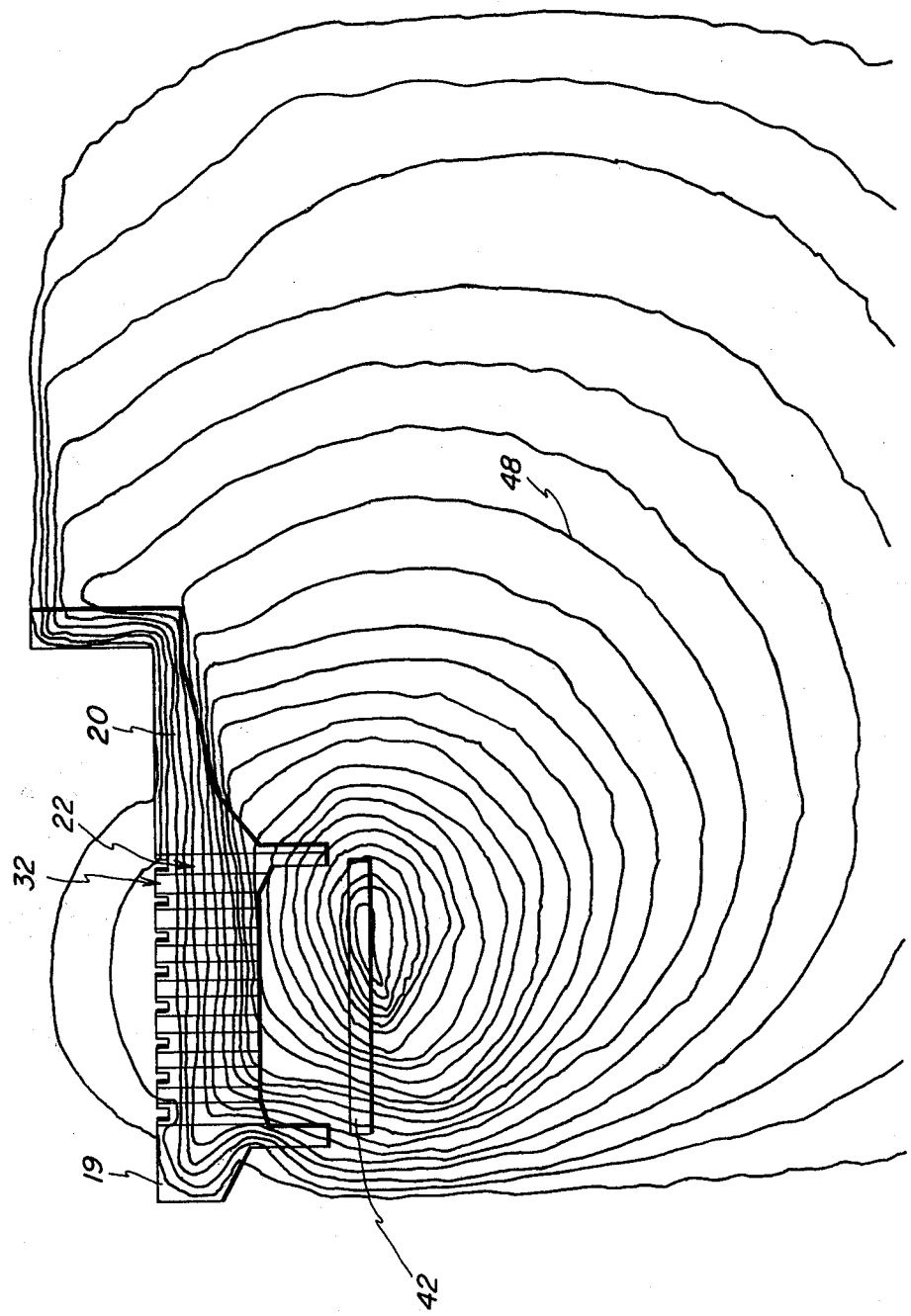
FIG. 4 schematically illustrates the magnetic field produced by an active shield alone attached to the machine of FIG. 2.
Figure 5:
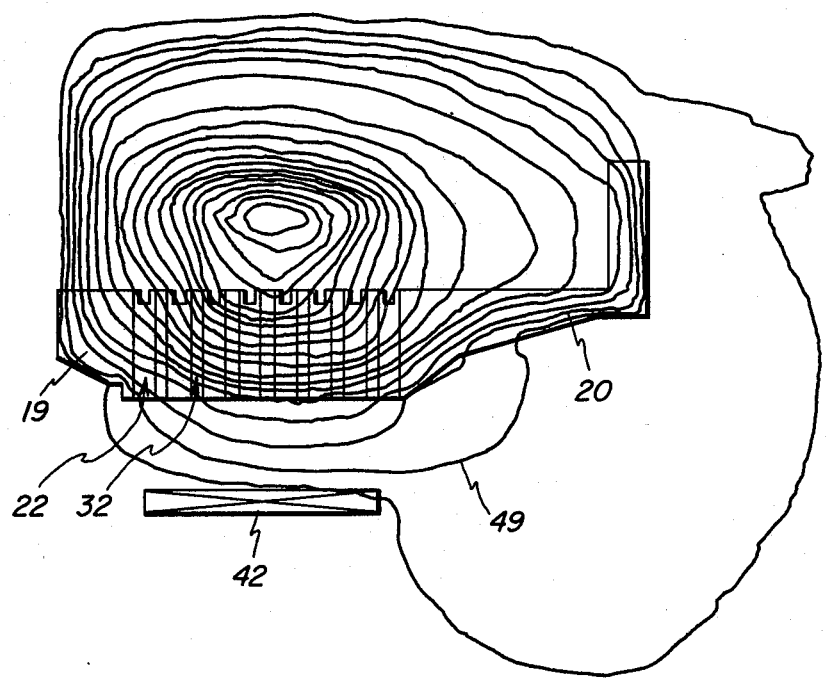
FIG. 5 schematically illustrates the effect upon the magnetic field generated by the main field coils produced by the active shield illustrated in FIG. 2.

In a specific embodiment, two opposed superconducting coils, each 2-½ inches thick by 11-½ inches long, were disposed within the rotor of a 3,000 HP motor. The current density at excitation of the superconducting coils was 8,500 amperes per square inch. The shielding coils were energized at 800 amperes per square inch. FIG. 3 illustrates a quadrant of cross section of this machine with respect to the magnetic iron cross sections and the magnetic flux, shown by lines 47, as produced by two opposed superconducting field coils. FIG. 4 illustrates the distribution of the magnetic field, shown by lines 48, produced by the 800 amps/in$^2$ current flow in the copper shielding coils with zero current in the superconducting coils. FIG. 5 illustrates the effect, shown by lines 49, upon the magnetic flux distribution of the addition of the current at approximately 800 amps/in$^2$ to the copper shielding coils on the magnetic field produced by the superconducting coils at 8500 amps/in$^2$. As can be seen in FIG. 5, the excitation of the two shielding coils effects the distribution of magnetic flux produced by the main field excitation coils, so that the magnetic flux leakage does not extend beyond the machine at the same intensity as in the unshielded case. Furthermore, as can be seen in FIGS. 3 and 4, the flux is additive in the region of the stator and rotor disks, thereby producing an additive effect in the torque-producing region of the machine.

As shown in FIG. 2, the two shielding coils 41, 42, preferably of copper although other conductive materials could be used, are disposed and connected to be self-opposed and also to be in polar opposition to the main field coil 14, 15, with which each shielding coil 41, 42 is axially aligned, respectively. This construction would be repeated throughout a machine having any desired number of main excitation coils. This configuration is selected so that the flux produced by shielding coils 41, 42 in the annular region radially between shielding coils 41, 42 and respective ones of the main field coils 14, 15 is additive. Since the polarity of coils, 41, 42 is opposed to that of the respective main field coils 14, 15, the flux produced by the shielding coils in the stray external flux region radially-outside coils 41, 42 (and also outside the main field coils) is subtractive. Therefore, the stray flux produced by the main field coils radially outside the radius of the machine itself is cancelled by the flux generated by the shielding coils. Likewise, the magnetic flux produced by the added coils 41, 42 in the maximum flux density region radially-inside the main field coils 14, 15 is subtractive, since for this region the polarities of the shielding coils and main field coils are opposed.

In the specific embodiment described above, during normal operation the density of axially-directed flux produced by the shielding coils in the region of the rotor and stator disks is an average of approximately 225 to 275 gauss. This may be compared with the average of approximately 15,530 gauss for the main excitation coils in the region of the rotor and stator disks. This excitation of the shielding coils may be adjusted by controlling the current density applied to the shielding coils to limit stray flux at a particular distance from the outer surface of the stator to a predetermined maximum when the machine is operating, (e.g., to limit stray field intensity to 100 gauss at a radial distance of six inches from the stator). It should be noted that no significant flux from the shielding coils passes through the rotor drum, and consequently the drum produces no additive effect contributing to the "take home" capability. When the main field coils are deenergized, the shielding coil may be energized to a higher field intensity, limited by coil heating, to provide greater power to the machine than when functioning primarily as a shield.

The instant invention also produces some improvement in the angle of the magnetic flux at the collector sites, which may produce a potential difference across the axial extent of single current collectors tending to cause resistive losses from circulating currents in the collector sites. Furthermore, when the shielding coil is energized, a reduced flux density in the main excitation coils would be required to provide any particular level of machine output. Therefore, my invention provides significant capabilities not offered by disk-drum type acyclic machines having no active shielding.

Best Mode

The best mode I contemplate for application of my invention utilizes superconducting field coils contained within a dewar cooled by liquid helium. The rotor and stator disks are made of magnetic steel and the current collector rings and the rotor drum are made of copper alloy. The current collectors employ sodium-potassium eutectic (NaK) to complete contact between the copper rings of each current collector. The shielding coils comprise copper coils disposed in axial alignment with and radially-outside respective ones of the main excitation coils.

I claim:

1. A high power density acyclic machine comprising in combination:
   a plurality of main magnetic field generating coils, said coils being disposed in spaced, coaxial arrangement within a cryogenic dewar and adjacent ones of said coils being electrically connected to a power source to be in polar opposition;
   a rotor comprising:
      a hollow rotatable shaft, surrounding said main field generating coils and said dewar;
      a plurality of radially-extending, electrically-conductive circular rotor disks rotatable with said shaft and mounted on said shaft in a plurality of axially-extending stacks radially outside said main field generating coils, each of said stacks of rotor disks being in axial alignment with one of said main field generating coils, respectively;
      an electrically conductive cylindrical drum member disposed axially between an electrically connected to each axially adjacent pair of stacks of rotor disks;
   a stator comprising:
      a hollow fixed shielding member of low magnetic reluctance material concentric with and surrounding said rotatable shaft at each axial end of said shaft;
      a plurality of axially extending stacks of radially-extending, electrically conductive circular stator disks, each said stack of stator disks being interleaved with one of said stacks of rotor disks, respectively;
      a hollow sleeve of low magnetic reluctance material disposed between and connected to each axially adjacent pair of stacks of stator disks, concentric with and surrounding each said cylindrical drum member, said stator and said rotor being separated throughout by a gap;
   a plurality of electrically conductive liquid metal current collectors interconnecting said interleaved disks and said drum member in a single series electrical connection; and
   a plurality of active shielding coils disposed radially outside said stator, said shielding coils being disposed in a spaced, coaxial arrangement; each of said plurality of shielding coils being disposed in axial alignment with one of said plurality of main field generating coils, respectively; said shielding coils being electrically connected to a power source such that adjacent ones of said shielding coils are in polar opposition to each other, and in polar opposition with said respective one of said main field generating coils.

2. The apparatus of claim 1 wherein each of said main field generating coils comprises a superconducting coil disposed within a dewar.

3. The apparatus of claim 2 wherein each of said active shielding coils comprises a coil of copper.

4. The apparatus of claim 3 wherein said plurality of main field generating coils comprises two superconducting coils and said plurality of active shielding coils comprises two copper coils each disposed concentrically around one of said superconducting coils, respectively.

5. The apparatus of claim 4 wherein said active shielding coils are each mounted at each axial end thereof on a ring of nonmagnetic material disposed respectively upon one said hollow shielding member and said hollow sleeve.

6. A method of energizing a high flux density acyclic machine comprising the steps of:

disposing a plurality of active shielding coils in axial alignment radially outside a plurality of high flux density main field generating coils, such that each said active shielding coil is axially aligned with one of said main field generating coils, respectively;

electrically exciting said main field generating coils with electrical current so that adjacent ones of said main field coils are in polar opposition;

electrically exciting said active shielding coils with electrical current so that each said active shielding coil is in polar opposition with the respective main field generating coil surrounded thereby, and such that the current applied to said active shielding coil produces a current density within said active shielding coils of a predetermined proportion of the main field coil excitation current density.

7. The method of claim 6 wherein said step of exciting said main field generating coils comprises providing each said main excitation coil with an excitation current of about 8500 amperes per square inch; and said step of exciting said active shielding coils comprises providing each said active shielding coil with an excitation current of approximately 800 amps per square inch.

8. The method of claim 6 further comprising:
deenergizing said main field generating coils while maintaining said active shielding coils electrically energized.

9. The method of claim 8 further comprising:
after said step of deenergizing said main field generating coils, increasing the current density applied to said active shielding coils.

10. The method of claim 6 wherein said step of exciting said active shielding coils comprises applying an electrical current to said shielding coils such that the flux density of the stray field at a radial distance of six inches outside said stator is limited to a maximum of 100 gauss.

* * * * *